(12) United States Patent
Ballapuram

(10) Patent No.: US 10,771,340 B2
(45) Date of Patent: Sep. 8, 2020

(54) AUTOMATIC ETHERNET STORAGE DISCOVERY IN HYPERSCALE DATACENTER ENVIRONMENT

(71) Applicant: Samsung Electronics Co., Ltd., Suwon-si, Gyeonggi-do (KR)

(72) Inventor: Chinnakrishnan Ballapuram, San Jose, CA (US)

(73) Assignee: Samsung Electronics Co., Ltd. (KR)

(*) Notice: Subject to any disclaimer, the term of this patent is extended or adjusted under 35 U.S.C. 154(b) by 228 days.

(21) Appl. No.: 15/615,508

(22) Filed: Jun. 6, 2017

(65) Prior Publication Data
US 2018/0270119 A1    Sep. 20, 2018

Related U.S. Application Data

(60) Provisional application No. 62/472,379, filed on Mar. 16, 2017.

(51) Int. Cl.
*H04L 12/24* (2006.01)
*H04L 29/12* (2006.01)
*H04L 29/08* (2006.01)

(52) U.S. Cl.
CPC .......... *H04L 41/12* (2013.01); *H04L 61/2015* (2013.01); *H04L 67/1097* (2013.01); *H04L 67/16* (2013.01)

(58) Field of Classification Search
CPC ..... H04L 41/12; H04L 67/16; H04L 67/1097; H04L 61/2015
USPC ....................................................... 709/223
See application file for complete search history.

(56) References Cited

U.S. PATENT DOCUMENTS

| | | | | |
|---|---|---|---|---|
| 6,253,240 B1 * | 6/2001 | Axberg | ..................... | G06F 8/34 709/223 |
| 7,908,252 B1 * | 3/2011 | Landt | ..................... | G06F 16/24 707/687 |
| 8,019,849 B1 * | 9/2011 | Lopilato | ............. | G06F 16/1827 709/223 |

(Continued)

OTHER PUBLICATIONS

"NVME Express over Fabric", NVMExpress.org, http://www.nvmexpress.org/specifications/, Jun. 5, 2016.

*Primary Examiner* — Abdullahi E Salad
(74) *Attorney, Agent, or Firm* — Innovation Counsel LLP

(57) ABSTRACT

A storage system includes: a plurality of storage devices, each of which being configured to run a DHCP client and a discovery log updater; a host computer configured to provide I/O or compute workloads to the plurality of storage devices; and a discovery server configured to provide a discovery log page to the host computer. The DHCP client and the discovery log updater are running on each of the plurality of storage devices provides a discovery log entry of the corresponding storage device to the discovery server. The discovery log page contains discovery information of the plurality of storage devices including one or more discovery log entries, and each of the one or more discovery log entries includes an address of the corresponding storage device that is assigned to establish communication between the host computer and the corresponding storage device. The host computer establishes a connection with a target storage device using the discovery log entry of the target storage device contained in the discovery log page and provides I/O or compute workloads to the target storage device.

22 Claims, 6 Drawing Sheets

(56) References Cited

U.S. PATENT DOCUMENTS

| | | | |
|---|---|---|---|
| 8,775,486 B2 | 7/2014 | Carmichael | |
| 9,384,093 B1 | 7/2016 | Aiello | |
| 9,519,578 B1 | 12/2016 | Kuzmin et al. | |
| 9,602,600 B1* | 3/2017 | Tsao | H04L 41/0663 |
| 10,230,544 B1* | 3/2019 | McDowell | H04L 12/4645 |
| 2001/0044879 A1* | 11/2001 | Moulton | G06F 3/0617 |
| | | | 711/114 |
| 2002/0196744 A1* | 12/2002 | O'Connor | H04L 29/06 |
| | | | 370/254 |
| 2004/0064545 A1* | 4/2004 | Miyake | H04L 41/0853 |
| | | | 709/224 |
| 2004/0068561 A1* | 4/2004 | Yamamoto | G06F 3/0605 |
| | | | 709/224 |
| 2004/0078419 A1* | 4/2004 | Ferrari | H04L 29/06 |
| | | | 709/201 |
| 2004/0215688 A1* | 10/2004 | Frank | H04L 12/28 |
| | | | 709/200 |
| 2006/0075196 A1* | 4/2006 | Kobayashi | G06F 9/4416 |
| | | | 711/147 |
| 2006/0101130 A1* | 5/2006 | Adams | H04L 29/12009 |
| | | | 709/218 |
| 2007/0079062 A1* | 4/2007 | Miyawaki | G06F 3/061 |
| | | | 711/112 |
| 2007/0143480 A1* | 6/2007 | Arroyo | H04L 61/2015 |
| | | | 709/226 |
| 2008/0028045 A1* | 1/2008 | Bealkowski | H04L 41/0803 |
| | | | 709/219 |
| 2008/0109442 A1* | 5/2008 | Shinohara | H04L 67/1097 |
| 2012/0089725 A1* | 4/2012 | Acuna | H04L 67/1097 |
| | | | 709/224 |
| 2013/0108247 A1* | 5/2013 | Kawahara | H04L 67/1097 |
| | | | 386/297 |
| 2014/0157024 A1* | 6/2014 | Huang | G06F 1/3234 |
| | | | 713/323 |
| 2014/0195634 A1 | 7/2014 | Kishore et al. | |
| 2014/0289377 A1* | 9/2014 | Dutko | H04L 41/0803 |
| | | | 709/220 |
| 2015/0304423 A1 | 10/2015 | Satoyama et al. | |
| 2016/0072761 A1* | 3/2016 | Shih | H04L 61/2015 |
| | | | 709/220 |
| 2016/0085718 A1 | 3/2016 | Huang | |
| 2016/0087847 A1* | 3/2016 | Krithivas | H04L 41/12 |
| | | | 709/224 |
| 2016/0127468 A1 | 5/2016 | Malwankar et al. | |
| 2016/0127492 A1* | 5/2016 | Malwankar | H04L 67/2842 |
| | | | 709/212 |
| 2017/0093640 A1* | 3/2017 | Subramanian | H04L 41/12 |
| 2017/0302589 A1* | 10/2017 | Leafe | G06F 9/44526 |
| 2018/0024964 A1* | 1/2018 | Mao | G06F 3/0655 |
| | | | 711/173 |
| 2018/0074984 A1* | 3/2018 | Olarig | G06F 13/36 |
| 2018/0089456 A1* | 3/2018 | Peloso | H04L 67/1097 |
| 2018/0095872 A1* | 4/2018 | Dreier | G06F 3/067 |
| 2018/0113640 A1* | 4/2018 | Fernandez | G06F 3/0634 |
| 2018/0262567 A1* | 9/2018 | Klein | H04L 67/1097 |
| 2018/0375953 A1* | 12/2018 | Casassa Mont | H04L 12/28 |

* cited by examiner

| Byte | Description |
|---|---|
| 07:00 | Generation Counter |
| 15:08 | Number of Records |
| 17:16 | Record Format |
| 1023:18 | Reserved |
| 2047:1024 | Discovery Log Entry 0 |
| 3017:2048 | Discovery Log Entry 1 |
| ... | ... |
| (((N+2) x 1024 -1):((N+1) x 1024) | Reserved |

FIG. 2

| Byte | Description |
|---|---|
| 00 | Transport Type |
| 01 | Address Family |
| 02 | Subsystem Type |
| 03 | Transport Requirements |
| 05:04 | Port ID |
| 07:06 | Controller ID |
| 09:08 | Admin Max SQ Size |
| 31:10 | Reserved |
| 63:32 | Transport Service Identifier |
| 255:64 | Reserved |
| 511:256 | NVM Subsystem Qualified Name (NQN) |
| 767:512 | Transport Address |
| 1023:768 | Transport Specific Address Subtype |

FIG. 3

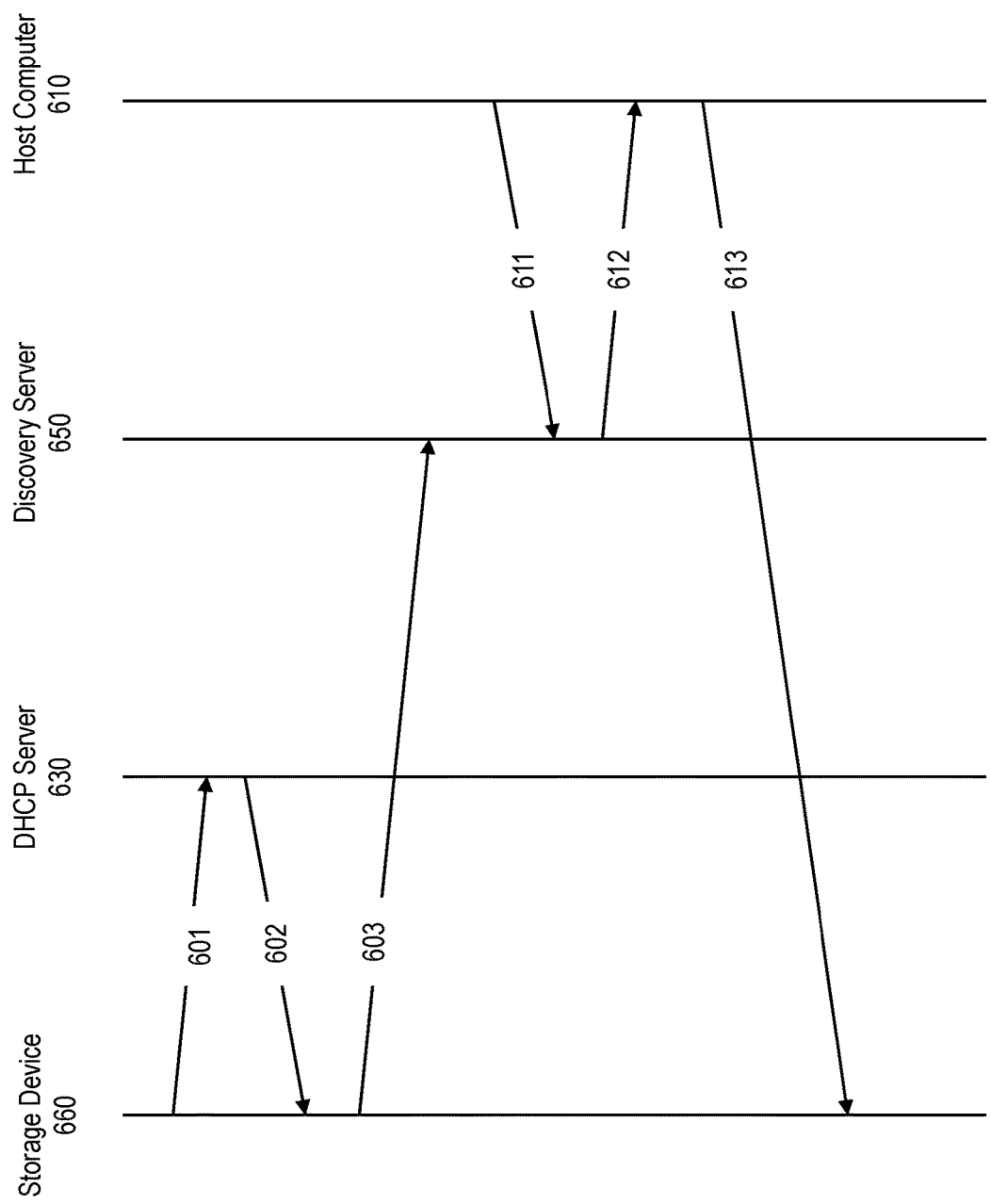

AUTOMATIC ETHERNET STORAGE DISCOVERY IN HYPERSCALE DATACENTER ENVIRONMENT

CROSS-REFERENCE TO RELATED APPLICATION(S)

This application claims the benefits of and priority to U.S. Provisional Patent Application Ser. No. 62/472,379 filed Mar. 16, 2017, the disclosure of which is incorporated herein by reference in its entirety.

TECHNICAL FIELD

The present disclosure relates generally to distributed storage devices, more particularly, to a system and method for providing automatic discovery of the distributed storage devices in a hyperscale datacenter environment.

BACKGROUND

Each rack in a datacenter contains a combination of sleds and/or trays for compute and storage devices. A hyperscale datacenter may include several performance optimized datacenters (PODs), and each POD can include multiple racks and hundreds and thousands of compute and/or storage devices.

Non-volatile memory express (NVMe) defines a register-level interface for host software to communicate with a non-volatile memory subsystem (e.g., a solid-state drive (SSD)) over a peripheral component interconnect express (PCIe) bus. NVMe over fabrics (NVMeoF) (or NVMf in short) defines a common architecture that supports an NVMe block storage protocol over a wide range of storage networking fabrics such as Ethernet, Fibre Channel, Infini-Band, a transmission control protocol (TCP) network, and other network fabrics.

In an NVMeoF-based storage system, each storage device, also referred to as an NVMeoF-compatible SSD or Ethernet SSD, is identified by its subsystem NVMe Qualified Name (NQN), Internet Protocol (IP) address, port ID, and/or controller ID. Each POD manager needs to know the status and availability of the storage devices on the fabrics (e.g., Ethernet) to allocate and schedule workloads. Some of the storage devices may be down for maintenance, and workloads cannot be assigned to those storage devices. Further, the collection, maintenance, and update of the discovery information from hundreds and thousands of storage devices that are distributed over the fabrics in a hyperscale datacenter environment is not a trivial task.

SUMMARY

According to one embodiment, a storage system includes: a plurality of storage devices, each of the plurality of storage devices being configured to run a dynamic host configuration protocol (DHCP) client; and a discovery server configured to provide a discovery log page to a host computer. A discovery log updater running on each of the plurality of storage devices provides a discovery log entry of the corresponding storage device to the discovery server. The discovery log page contains discovery information of the plurality of storage devices including one or more discovery log entries, and each of the one or more discovery log entries includes an address of the corresponding storage device that is assigned to establish communication between the host computer and the corresponding storage device. The host computer establishes a connection with a target storage device using the discovery log entry of the target storage device contained in the discovery log page and provides input/output (I/O) or compute workloads to the target storage device.

According to another embodiment, a method includes: running a dynamic host configuration protocol (DHCP) client in a storage device; providing a discovery log entry of the storage device to a discovery server; providing a discovery log page from the discovery server to a host computer, wherein the discovery log page contains discovery information of a plurality of storage devices including one or more discovery log entries, and each of the one or more discovery log entries includes an address of the corresponding storage device that is assigned to establish communication between the host computer and the corresponding storage device; establishing a connection between the host computer and a target storage device using the discovery log entry of the target storage device contained in the discovery log page; and providing input/output (I/O) or compute workloads from the host computer to the target storage device.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

FIG. 2 shows a data structure of an example discovery log page, according to one embodiment;

FIG. 3 shows a data structure of an example log entry contained in a discovery log page, according to one embodiment;

FIG. 6 illustrates an example process of automatic discovery, according to one embodiment.

Figure 1:
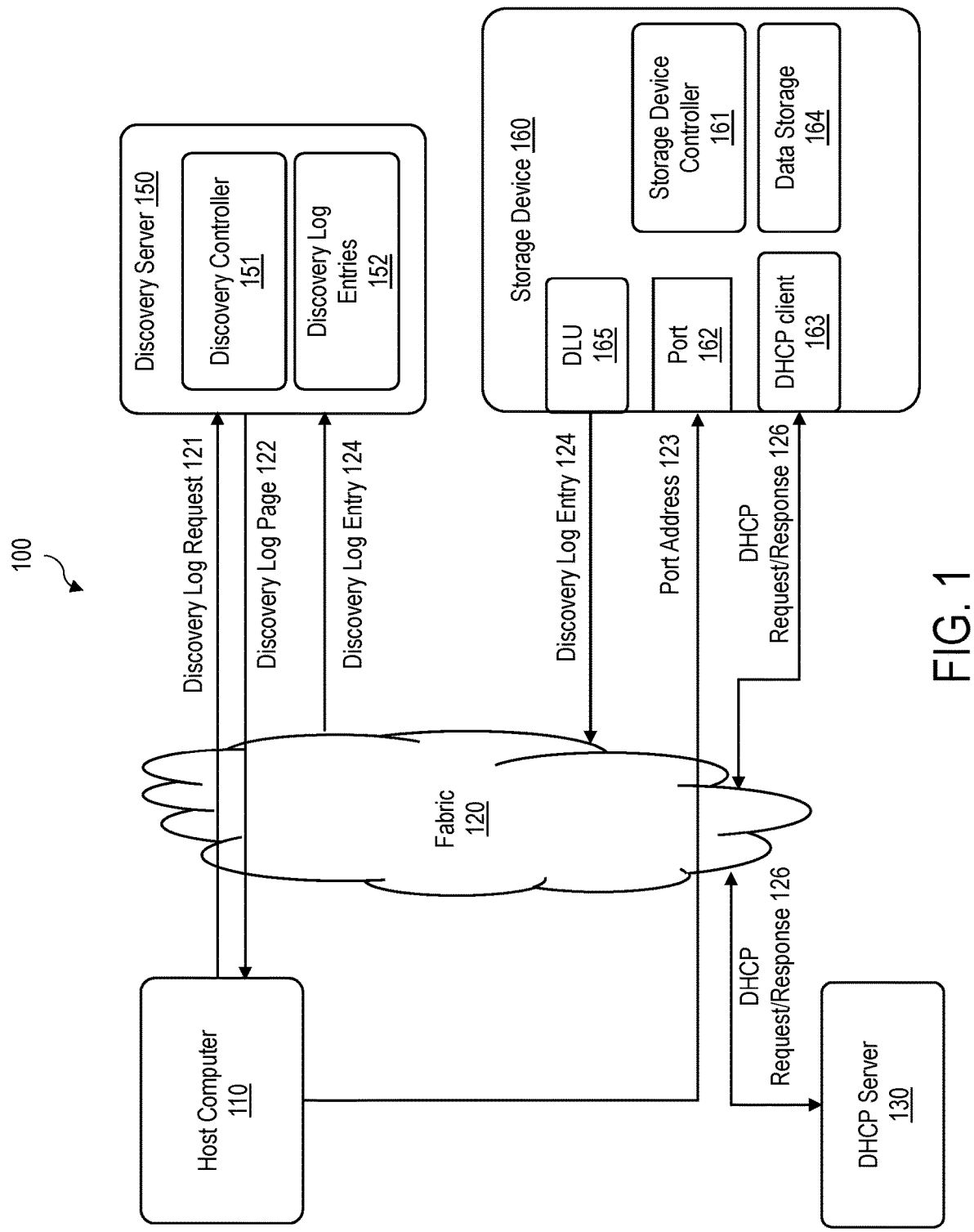
FIG. 1 shows a block diagram of an example distributed storage device system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for providing an automatic Ethernet storage discovery in a hyperscale datacenter environment. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a distributed data storage system including a plurality of data storage devices. The present distributed data storage system employs a dynamic host configuration protocol (DHCP) service to provide, update, and maintain dynamic discovery information of the plurality of data storage devices. An example of a transport protocol supported for communication among the subsystems of the distributed data storage system is the NVMeoF protocol, and the fabric is the Ethernet. The subsystems include one or more compute nodes (e.g., remote host computers or computing nodes) and a plurality of storage devices (e.g., Ethernet SSDs).

The NVMeoF standard defines a discovery service of an NVMeoF-based system to allow a host computer (herein also referred to as a host or a computing node) to identify and locate subsystems (herein also referred to as storage devices or nodes) that the host computer can access. A discovery server that provides the discovery service is a subsystem that exposes one or more discovery controllers to host computers of the NVMeoF-based system. Each of the discovery controllers of the discovery server can provide a discovery log page to a requesting host computer.

A discovery log page provided by a discovery controller can contain one or more discovery log entries. Each discovery log entry contained in the discovery log page specifies information that is necessary for the host computer to connect to a subsystem via an NVMe transport protocol. For example, a discovery log entry specifies a subsystem that exposes its namespace or a referral to another discovery service. According to the NVMeoF specification, the maximum referral depth may be eight levels or less.

FIG. 1 shows a block diagram of an example distributed storage device system, according to one embodiment. The distributed storage system 100 includes a host computer 110, a dynamic host configuration protocol (DHCP) server 130, a discovery server 150, a storage device 160, a fabric 120 that provides the connectivity among the host computer 110, the DHCP server 130, the discovery server 150, and the storage device 160 over an established network. An example of the fabric 120 is Ethernet.

The host computer 110 can represent one of many host computers of the distributed storage system 100, and the storage device 160 can represent one of many storage devices of the distributed storage system 100. According to one embodiment, the host computer 110 refers to a compute node of the distributed storage system 100 that can issue workloads to the storage devices or simply perform read/write access to the data stored in the storage devices of the distributed storage system 100 including the storage device 160.

The storage device 160 includes a storage device controller 161, a port 162, a DHCP client 163, a data storage 164 such as a solid-state drive (SSD), and a discovery log updater (DLU) 165. In one embodiment, the DLU 165 is a service running on the storage device 160 to update the discovery log entry of the storage device 160 in the discovery log entries 152 of the discovery server 150 using the fabric transport protocol and a port using RESTful API or a GraphQL request. For example, the DLU 165 can use TCP/IP or UDP/IP and a TCP/UDP port to update the discovery log entry of the storage device 160 in the discovery log entries 152 of the discovery server 150. The DHCP server 130 is a subsystem of the distributed storage system 100 that provides a dynamic or permanent lease IP address to a requesting DHCP client. For example, the DHCP client 163 of the storage device 160 sends a request 126 to the DHCP server 130, and the DHCP server 130 assigns an IP address (a dynamic IP address or a permanent IP address) to the DHCP client 163 in a response to the request 126.

The discovery server 150 provides a discovery service to any requesting host computer that is configured to get discovery log information from the discovery server 150. The discovery server 150 includes a discovery controller 151 and discovery log entries 152 as well as other components as described in the NVMeoF discovery server specification that are not particularly relevant to the discussion here. The IP or transport address of the discovery controller 151 is exposed to one or more host computers of the distributed storage system 100 including the host computer 110. In addition, the hosts may use a well-known discovery service NQN (e.g., nqn.2014-08.org.nvmexpress.discovery) in the connect command to a discovery service.

The host computer 110 can use the discovery service of the discovery server 150 to find the information necessary to connect to one or more storage devices that are available within the distributed storage system 100. The host computer 110 can obtain the initial discovery information in several ways. For example, a newly attached host computer without an IP address of the discovery server 150 can obtain the initial discovery information from a local host configuration file or from a hypervisor of an operating system (OS) of the host computer, or any other subsystem that is known to the host computer. The host computer 110 may also use the discovery service NQN (e.g., nqn.2014-08.org.nvmexpress.discovery) address in the connect command to a discovery service. The discovery method that the host computer 110 uses to obtain the NVMe transport information necessary to connect to the discovery service is based on the fabric protocol used. The initial discovery service information may include an IP address of the discovery server 150 or another subsystem that has the information for the discovery server 150.

Once the identity of the discovery server 150 is known, for example, the IP address of the discovery server 150, the host computer 110 sends a discovery log request 121 (e.g., a Get Log Page request according to the NVMeoF specification) to the discovery server 150 to obtain discovery information on an as needed basis. In response, the discovery server 150 provides a discovery log page 122 including one or more discovery log entries 152. Each discovery log entry contained in the discovery log page 122 specifies information necessary for the host computer 110 to connect to one or more corresponding storage device(s) 160. For example, each entry includes one or more identifiers of the corresponding storage device(s) 160 and the supported transport protocol information to connect to the storage device(s) 160. The discovery log entries 152 can support multiple transport protocols and address types.

According to one embodiment, the discovery server 150 can voluntarily send the most updated discovery log entries 152 to the host computer 110. For example, the discovery server 150 keeps a list of host computers, which may be a discovery server responsible for the POD/POD manager in one case and sends the updated discovery log page 122 to the listed host computers as one or more discovery log entries are updated, or at a predetermined interval (e.g., every day, every week). In this case, the discovery log page 122 can contain a subset of the stored discovery log entries 152 including only the updated discovery log entries.

Based on the discovery log entry and the transport type corresponding to the storage device 160 as identified in the discovery log page 122, the host computer 110 can identify a port address 123 of a target storage device 160 and establish a communication path with the target storage device 160 using the port address 123 using the indicated supported transport type and protocol. All the required information to initiate a connection between the host and the target storage device is transferred in the discovery log page 122. The storage device controller 161 of the storage device 160 and host computer 110 can communicate with each other using the established port 162.

The DHCP client 163 running on the storage device 160 sends a request to the DHCP server 130, and the DHCP server 130 assigns an IP address (or a similar address corresponding to an IP address in the corresponding fabric) to the requesting DHCP client 163. A DLU 165 runs on each target storage devices or for a group of target storage devices. For example, for all or some of the storage devices 160 in a chassis/rack, one or few DHCP clients 163 may be used. Similarly, one or few DLUs 165 can update the logs for one storage device 160 or a group of storage devices 160 in the chassis/rack. The DHCP and DLU services may be running on one or few storage devices 160, or on a general purpose central processing unit (CPU), or on a baseboard management controller (BMC) in the chassis/rack. The DHCP client 163 or the DLU 165 can send a discovery log entry 124 including the assigned IP address of the storage device controller 161 to the discovery server 150. According to one embodiment, the DHCP server 130 and the discovery server 150 are collocated in the same server. In some embodiments, the DHCP server 130 is another system outside the distributed storage system 100 that is different from the discovery server 150.

The discovery server 150 collects and updates the discovery log information including one or more discovery log entries 152 that are received from one or more DLUs 165 of the target storage devices using RESTful API or a GraphQL request. The discovery server 150 provides a discovery log page to a requesting host computer 110 as a response to an NVMeoF Get Log Page request. The automatic update of the discovery information by a DLU running on each or group of target storage devices using the assigned IP address by the DHCP client can provide a seamless discovery service to the requesting host computer with the most updated discovery information that is necessary to connect to a target storage device residing in the present distributed storage system.

New storage devices can be added and some storage devices can shut down as a part of routine operational processes in a datacenter environment due to an addition of new storage devices, a replacement or retirement of existing storage devices. As each respective DCHP client 163 of the storage devices 160 on lease can update its own current information, the DHCP server 130 can keep the most up to date discovery log information. Using the automated update scheme of the discovery log information by a thin DHCP client 163 running on each of the storage devices 160, the present distributed storage system 100 can provide a scalable solution that can accommodate hundreds and thousands of storage devices in a hyperscale datacenter environment.

FIG. 2 shows a data structure of an example discovery log page, according to one embodiment. The discovery log page 200 shown in FIG. 2 contains various parameters related to a discovery information including, but not limited to, a generation counter, a number of records, a record format, one or more discovery entries 300. FIG. 3 shows a data structure of an example log entry contained in the discovery log page 200 of FIG. 2. The log page entry 300 can include various parameters related to a particular log entry including, but not limited to, a transport type (e.g., remote direct memory access (RDMA), Fibre Channel, TCP network), an address family (e.g., IPv4, Ipv6, IB, FC), a port ID, a subsystem type, transport requirements, a controller ID, an admin max SQ size, a transport service identifier, an NVM subsystem NQN, a transport address (an IP address of a storage device), and a transport specific address subtype. The discovery log page 200 shown in FIG. 2 can contain one or more log entries 300.

A host computer may receive more than one discovery log pages. In this case, the host computer checks for a revision history of the discovery log pages, and determines if there is a change in the discovery log information. According to one embodiment, the host computer can receive multiple discovery log pages from one or more discovery servers. The host computer can read the received discovery log pages in a specific order (e.g., with increasing log page offset values) and count the generation counter. The generation counter indicates the version of the discovery information, starting at a value of 0h. For each change in the discovery log, the generation counter is incremented by one. If the maximum count is exceeded, the generation counter wraps to the initial value of 0h. If the generation counter mismatches the previously read log information, the host computer discards the previously read log page and updates the log information accordingly. If the log page contents change during the log page reading, the discovery controller may return a status indicating a discovery restart. According to the discovery restart as indicated by the discovery controller, the host computer stops the current discovery process and restarts a new discovery process.

After retrieving the most updated discovery log entries from the discovery server, the host computer uses the IP address of a target storage device that is contained in the corresponding log entry and prepares a transport-level connection by initializing queue pairs to communicate with the target storage device. In doing so, the host computer issues a connect command to create controller queues to establish the transport-level connection with the target storage device. The connect command can specify various parameters including, but not limited to, a port ID, a type of the queues (e.g., admin queues or I/O queues), a size of the submission and completion queues, queue attributes, a host NQN, an NVM subsystem NQN, and a host identifier. In response, the target storage device sends a connect response to the host computer indicating whether the connection is successfully established. The connect response can contain the storage device controller ID allocated for the communication with the host computer.

In a hyperscale datacenter environment, the information required to establish a proper connection between a host computer and a target storage device can be exchanged via a fabric that is supported by the transport protocol (e.g., the fabric 120 of FIG. 1). The underlying fabric 120 could be different between the host computer 110 and the discovery server 150, between the host computer 110 and the storage device 160, and between the DHCP server 130 and the storage device 160 and need not be same between the host computer 110, the DHCP server 130, the discovery server 150, and the storage device 160. For example, the present distributed storage system can include hundreds or thousands of host computers and storage devices that are distributed over an enterprise network, a datacenter, and/or the Internet. Some of the subsystems of the present distributed storage system may be connected via a first type of fabrics while other subsystems of the present distributed storage system may be connected via a second type of fabrics that is different from the first type of fabrics. For example, a discovery server may reside on a public network (e.g., the Internet), and the host computer and the target storage device may be connected over a private network.

The present discovery service based on a DHCP service can be used as the number of host computers and storage devices expands and scales. According to one embodiment, each rack in a datacenter can run a rack-level discovery server that can automatically update and maintain the discovery information of the storage devices that are specific to the rack. A POD can include a plurality of racks, and each rack-level discovery server can automatically update the rack-level discovery information to a POD-level discovery server running on a POD manager. The POD-level discovery server allows the POD manager to schedule workloads based on the POD-level discovery information.

According to one embodiment, the present distributed storage system can include multiple POD managers, one POD manager for each POD. The workloads can be distributed among the multiple POD managers based on the system-level discovery information that can be exchanged among the POD managers. In an alternative embodiment, a POD manager can communicate to the DHCP server and collaborate with other POD managers to perform the workload distribution. For example, a backup data may be available from a remote storage device during a downtime of a target storage device. In this case, the POD manager can schedule the workloads to the backup storage device using the system-level discovery information. In the case of an NVMeoF-based storage system, any POD manager can connect to one or more discovery servers and retrieve the updated discovery information of the available storage devices using a get log command. Once a communication path is established using the discovery information, the target storage device can serve the I/O requests received from the host computer. Because the present discovery service does not require a manual update, the present discovery service is scalable for a hyperscale datacenter that can include many racks and PODs and racks including many compute and/or storage devices therein.

Figure 4:
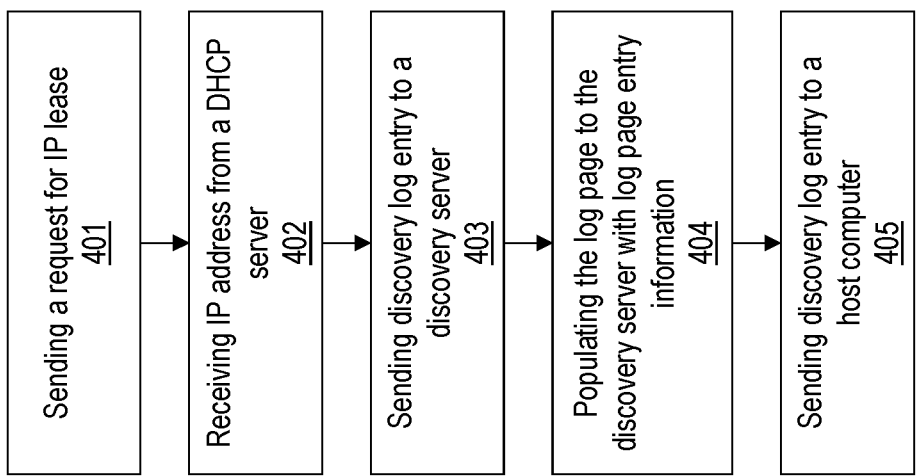
FIG. 4 shows an example flowchart for populating discovery log information, according to one embodiment.

FIG. 4 shows an example flowchart for populating discovery log information, according to one embodiment. A storage device runs a DHCP client upon booting up and sends a request to a DHCP server to lease an IP address (401). The DHCP server assigns a dynamic or permanent IP address to a storage device controller of the storage device in response to the request by the DHCP client (402). A DLU running on the storage device sends a discovery log entry including the IP address and a port address of the storage device controller to a discovery server (403) using RESTful API or a GraphQL request. The discovery server populates a discovery log page including one or more discovery log entries of a plurality of storage devices (404). The discovery server sends a discovery log page to a host computer (405).

Figure 5:
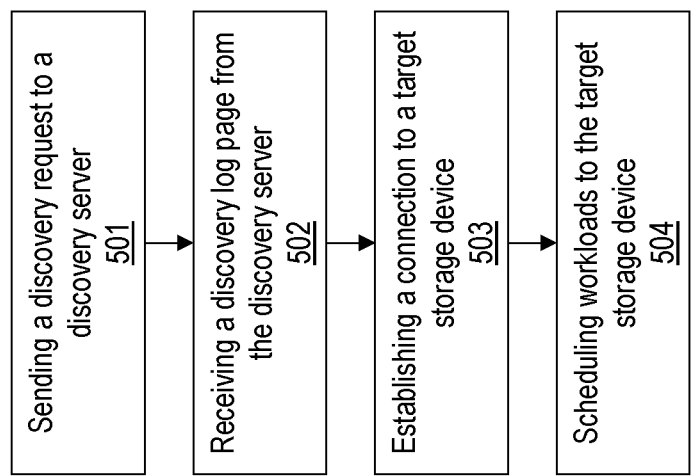
FIG. 5 shows an example flowchart for establishing communication between a host computer and a target storage device, according to one embodiment.

FIG. 5 shows an example flowchart for establishing communication between a host computer and a target storage device, according to one embodiment. A host computer sends a request for discovery information to a discovery server (501). The discovery server stores one or more discovery log entries received from the DLUs of a plurality of storage devices. The host computer receives a discovery log page including the one or more discovery log entries from the discovery server (502). Using the one or more discovery log page entries received in the discovery log page, the host computer establishes a connection with a target storage device (503) and schedules workloads to the target storage device (504).

FIG. 6 illustrates an example process of automatic discovery, according to one embodiment. A DHCP client of a storage device 660 sends a request to a DHCP server 630 to obtain an IP address (601), and the DHCP server 630 assigns and sends an IP address to the DHCP client of the storage device 660. The DLU of the storage device 660 (or the DHCP server 630) automatically sends a discovery log entry of the storage device 660 to a discovery server 650 using a RESTful API or a GraphQL request (603). The discovery server 650 collects one or more discovery log entries from each DLU of a plurality of storage devices and prepare a discovery log page including the one or more discovery log entries. A host computer 610 sends a get log page command to the discovery server 650 (611), and in return, the discovery server 640 sends the discovery log page to the host computer 610 (612). Using the information contained in the discovery log page, the host computer 610 establishes a connection to the storage device 660 (613).

According to one embodiment, a storage system includes: a plurality of storage devices, each of the plurality of storage devices being configured to run a dynamic host configuration protocol (DHCP) client; and a discovery server configured to provide a discovery log page to a host computer. A discovery log updater running on each of the plurality of storage devices provides a discovery log entry of the corresponding storage device to the discovery server. The discovery log page contains discovery information of the plurality of storage devices including one or more discovery log entries, and each of the one or more discovery log entries includes an address of the corresponding storage device that is assigned to establish communication between the host computer and the corresponding storage device. The host computer establishes a connection with a target storage device using the discovery log entry of the target storage device contained in the discovery log page and provides input/output (I/O) or compute workloads to the target storage device.

A DHCP server may assign the address for each of the plurality of storage devices, and each discovery log updater of the plurality of storage devices may use the assigned address to automatically send its respective discovery log entry including the assigned address to the discovery server.

The discovery log entry may further include a port address of a storage device controller.

The port address may be assigned according to the NVMeoF specification.

The discovery server may send the discovery log page to the host computer using a RESTful application programming interface (API) or a GraphQL request.

At least one of the plurality of storage devices may be a non-volatile memory express over fabrics (NVMeoF) device, and the host computer may send a get log command to the discovery server to receive the discovery log page.

The discovery server and the DHCP server may be collocated in a same server of the storage system.

The plurality of storage devices may be attached to a rack, and the discovery server in the rack may collect rack-level discovery information that is specific to the rack.

The plurality of storage devices may be distributed among a plurality of racks in a POD, and the discovery server responsible for a POD may collect POD-level discovery information that is specific to the POD.

A POD manager of the POD may schedule workloads among the plurality of storage devices based on the POD-level discovery information.

The POD manager may exchange the POD-level discovery information with another POD manager of the storage system.

According to another embodiment, a method includes: running a dynamic host configuration protocol (DHCP) client in a storage device; providing a discovery log entry of the storage device to a discovery server; providing a discovery log page from the discovery server to a host computer, wherein the discovery log page contains discovery information of a plurality of storage devices including one or more discovery log entries, and each of the one or more discovery log entries includes an address of the corresponding storage device that is assigned to establish communication between the host computer and the corresponding storage device; establishing a connection between the host computer and a target storage device using the discovery log entry of the target storage device contained in the discovery log page; and providing input/output (I/O) or compute workloads from the host computer to the target storage device.

A DHCP server may assign the address for each of the plurality of storage devices, and each discovery log updater of the plurality of storage devices may use the assigned address to automatically send its respective discovery log entry including the assigned address to the discovery server.

The discovery log entry may further include a port address of a storage device controller.

The port address may be assigned according to the NVMeoF specification.

The discovery server may send the discovery log page to the host computer using a RESTful application programming interface (API) or a GraphQL request.

At least one of the plurality of storage devices may be a non-volatile memory express over fabrics (NVMeoF) device, and the host computer may send a get log command to the discovery server to receive the discovery log page.

The discovery server and the DHCP server may be collocated in a same server of the storage system.

The plurality of storage devices may be attached to a rack, and the discovery server in the rack may collect rack-level discovery information that is specific to the rack.

The plurality of storage devices may be distributed among a plurality of racks in a POD, and the discovery server responsible for a POD may collect POD-level discovery information that is specific to the POD.

A POD manager of the POD may schedule workloads among the plurality of storage devices based on the POD-level discovery information.

The POD manager may exchange the POD-level discovery information with another POD manager of the storage system.

The above example embodiments have been described hereinabove to illustrate various embodiments of implementing a system and method for providing an automatic Ethernet storage discovery in a hyperscale datacenter environment. Various modifications and departures from the disclosed example embodiments will occur to those having ordinary skill in the art. The subject matter that is intended to be within the scope of the invention is set forth in the following claims.

What is claimed is:

1. A storage system comprising:
a plurality of storage devices, at least one storage device of the plurality of storage devices being configured to run a dynamic host configuration protocol (DHCP) client; and
a discovery server configured to provide a discovery log page to a host computer,
wherein the at least one storage device of the plurality of storage devices runs a discovery log updater that automatically provides a discovery log entry of a corresponding storage device to the discovery server based on an update of an Internet Protocol (IP) address of the corresponding storage device that is obtained at a request of the DHCP client,
wherein the discovery log page contains discovery information of the plurality of storage devices including one or more discovery log entries, and
wherein the host computer establishes a connection with a target storage device among the plurality of storage devices using an IP address of the target storage device with reference to the discovery log entry of the target storage device that is contained in the discovery log page and provides input/output (I/O) or compute workloads to the target storage device.

2. The storage system of claim 1, wherein a DHCP server assigns the IP address for the at least one storage device of the plurality of storage devices, and the discovery log updater of the at least one storage device of the plurality of storage devices uses the assigned IP address to automatically send its respective discovery log entry including the assigned IP address to the discovery server.

3. The storage system of claim 2, wherein the discovery server and the DHCP server are collocated in a same server of the storage system.

4. The storage system of claim 2, wherein the discovery log entry further includes a port address of a storage device controller.

5. The storage system of claim 4, wherein the port address is assigned according to the NVMeoF specification.

6. The storage system of claim 1, wherein the discovery server sends the discovery log page to the host computer using a RESTful application programming interface (API) or a GraphQL request.

7. The storage system of claim 1, wherein at least one of the plurality of storage devices is a non-volatile memory express over fabrics (NVMeoF) device, and the host computer sends a get log command to the discovery server to receive the discovery log page.

8. The storage system of claim 1, wherein the plurality of storage devices is attached to a rack, and the discovery server in the rack collects rack-level discovery information that is specific to the rack.

9. The storage system of claim 8, wherein the plurality of storage devices is distributed among a plurality of racks in a POD, and the discovery server responsible for a POD collects POD-level discovery information that is specific to the POD.

10. The storage system of claim 9, wherein a POD manager of the POD schedules workloads among the plurality of storage devices based on the POD-level discovery information.

11. The storage system of claim 10, wherein the POD manager exchanges the POD-level discovery information with another POD manager of the storage system.

12. A method comprising:
running a dynamic host configuration protocol (DHCP) client in a storage device;
automatically providing a discovery log entry of the storage device to a discovery server based on an update of an Internet Protocol (IP) address of the storage device that is obtained at a request of the DHCP client;
providing a discovery log page from the discovery server to a host computer, wherein the discovery log page contains discovery information of a plurality of storage devices including one or more discovery log entries;
establishing a connection between the host computer and a target storage device using an IP address of the target storage device with reference to the discovery log entry of the target storage device that is contained in the discovery log page; and
providing input/output (I/O) or compute workloads from the host computer to the target storage device.

13. The method of claim 12, wherein a DHCP server assigns the network address for at least one storage device of the plurality of storage devices, and a discovery log updater of the at least one storage device of the plurality of storage devices uses the assigned network address to automatically send its respective discovery log entry including the assigned network address to the discovery server.

14. The method of claim 13, wherein the discovery server and the DHCP server are collocated in a same server of the storage system.

15. The method of claim 13, wherein the discovery log entry further includes a port address of a storage device controller.

16. The method of claim 15, wherein the port address is assigned according to the NVMeoF specification.

17. The method of claim 12, wherein the discovery server sends the discovery log page to the host computer using a RESTful application programming interface (API) or a GraphQL request.

18. The method of claim 12, wherein at least one of the plurality of storage devices is a non-volatile memory express over fabrics (NVMeoF) device, and the host computer sends a get log command to the discovery server to receive the discovery log page.

19. The method of claim 12, wherein the plurality of storage devices is attached to a rack, and the discovery server in the rack collects rack-level discovery information that is specific to the rack.

20. The method of claim 19, wherein the plurality of storage devices is distributed among a plurality of racks in a POD, and the discovery server responsible for a POD collects POD-level discovery information that is specific to the POD.

21. The method of claim 20, wherein a POD manager of the POD schedules workloads among the plurality of storage devices based on the POD-level discovery information.

22. The method of claim 21, wherein the POD manager exchanges the POD-level discovery information with another POD manager of the storage system.

* * * * *